(12) United States Patent
Iijima et al.

(10) Patent No.: US 6,586,091 B2
(45) Date of Patent: Jul. 1, 2003

(54) MOLDED LAMINATE

(75) Inventors: Michihiro Iijima, Tochigi (JP); Hideki Takahashi, Mie (JP); Masatoshi Oomori, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/133,481

(22) Filed: Apr. 29, 2002

(65) Prior Publication Data

US 2003/0059606 A1 Mar. 27, 2003

Related U.S. Application Data

(63) Continuation of application No. PCT/JP01/07316, filed on Aug. 27, 2001.

(30) Foreign Application Priority Data

Aug. 30, 2000 (JP) ......................................... 2000-261699
Aug. 23, 2001 (JP) ......................................... 2001-253033

(51) Int. Cl.$^7$ ............................ B32B 7/12; B32B 27/08; B32B 27/30; B32B 27/34; B32B 27/36
(52) U.S. Cl. ................................ 428/355 AC; 428/343; 428/355 R; 428/355 EN; 428/412; 428/423.7; 428/480; 428/483; 156/297; 528/300; 528/301; 525/92 F; 525/437; 525/445
(58) Field of Search ............................ 428/343, 355 R, 428/355 EN, 355 AC, 412, 423.7, 475.2, 480, 483; 156/297; 528/300, 301; 525/92 F, 437, 445

(56) References Cited

U.S. PATENT DOCUMENTS

| | | | | |
|---|---|---|---|---|
| 5,164,445 A | * | 11/1992 | Nishida et al. | ............... 525/41 |
| 5,300,563 A | | 4/1994 | Kiang et al. | |
| 5,322,908 A | * | 6/1994 | Hamazaki et al. | .......... 525/445 |
| 5,385,987 A | * | 1/1995 | Hamazaki et al. | .......... 525/445 |

FOREIGN PATENT DOCUMENTS

| | | |
|---|---|---|
| JP | 2-217683 | 8/1990 |
| JP | 4-86257 | 3/1992 |
| JP | 4-86258 | 3/1992 |
| JP | WO 02/18134 | 3/2002 |

* cited by examiner

*Primary Examiner*—Vivian Chen
(74) *Attorney, Agent, or Firm*—Oblon, Spivak, McClelland, Maier & Neustadt, P.C.

(57) ABSTRACT

The invention provides a molded laminate with excellent adhesive strength which comprises an adhesive polymer composition layer and a gas-barrier resin layer comprising a polyamide resin or an ethylene-vinyl alcohol copolymer, the adhesive polymer composition layer comprising a modified polyester type elastomer obtained by modifying a saturated polyester type thermoplastic elastomer having a polyalkylene ether glycol segment content of 58 to 73% by weight with an unsaturated carboxylic acid or a derivative thereof in the presence of a radical generator.

22 Claims, No Drawings

MOLDED LAMINATE

This application is a continuation of PCT/JP01/07316, filed Aug. 27, 2001.

BACKGROUND OF THE INVENTION

This invention relates to a molded laminate comprising a thermoplastic resin layer of a polyamide resin, an ethylene-vinyl alcohol copolymer, etc. and an adhesive polymer composition layer exhibiting excellent heat fusion-bond properties, particularly excellent heat fusion-bond properties in a high-temperature atmosphere, to the thermoplastic resin layer.

DESCRIPTION OF THE BACKGROUND

Polyamide resins and ethylene-vinyl alcohol copolymers have been widely used in industrial equipment, domestic appliances, and the like for their excellence in toughness, heat resistance, wear resistance, and gas barrier properties. Applications taking advantage of their gas barrier properties include gas containers and gas pipes. An elastic body, such as a gasket or a sealing part, is inserted into or laminated at a joint of these molded products to secure air tightness or to facilitate handling. The advantage of the gas barrier properties is also exploited in developing packaging materials for foods calling for sealing. In particular, they find wide use in the field of drink bottles and food packaging, etc. It has been studied to laminate a polyester resin layer excellent in heat resistance, chemical resistance and mechanical characteristics, e.g., polyethylene terephthalate, with a polyamide resin layer to improve the gas barrier properties of the polyester resin, and to apply the laminate to containers for carbonated beverages, etc. and long-life packages which extend the shelf life of perishable foods, etc.

Apart from the above-described purposes, an elastic material can be laminated on a molded article for the purpose of imparting flexibility or waterproofness or improving impact resistance or feel to the touch. Vulcanized rubber has frequently been used as such an elastic material. However, because vulcanized rubber has poor heat fusion-bond properties to a polyamide resin or an ethylene-vinyl alcohol copolymer, when these materials are laminated, the interlaminar adhesion is insufficient, and bonding these materials requires an additional step, such as a step of applying a primer, e.g., an adhesive, to the joint area or a step of roughening the joint area.

In laminating a polyester resin layer with a polyamide resin layer, which are not welded together, it has been proposed that a composite material with an adhesive or an adhesive resin is produced. There is a problem, however, that the adhesive strength can reduce in high temperature treatment, such as sterilization or retorting in the food industry, easily resulting in delamination.

On the other hand, a polyester type thermoplastic elastomer comprising a copolymer containing a polyalkylene ether glycol segment is attracting attention as a substitute for vulcanized rubber because of its flexibility. However, it has poor heat fusion-bond properties to a polyamide resin or an ethylene-vinyl alcohol copolymer, providing weak adhesion particularly in a high temperature atmosphere, also causing delamination.

SUMMARY OF THE INVENTION

The present invention has been completed in the light of the above-mentioned circumstances. An object of the present invention is to provide a molded laminate comprising a thermoplastic resin layer of a polyamide resin, an ethylene-vinyl alcohol copolymer, etc. and an adhesive polymer composition layer having excellent heat fusion-bond properties to the resin layer, particularly excellent heat fusion-bond properties in a high-temperature atmosphere.

DETAILED DESCRIPTION OF THE PREFERRED EMBODIMENTS

As a result of intensive investigations for settling the above problems, the present inventors have found that an adhesive polymer composition comprising a modified polyester type elastomer obtained by modifying a saturated polyester type thermoplastic elastomer containing a specific amount of a polyalkylene ether glycol segment with an unsaturated carboxylic acid or a derivative thereof in the presence of a radical generator is excellent in heat fusion-bond properties, particularly heat-resistant adhesion, to a thermoplastic resin, such as a polyamide resin and an ethylene-vinyl alcohol copolymer. The present invention has been reached based on this finding.

The gist of the present invention consists in a molded laminate with excellent adhesive strength which comprises an adhesive polymer composition layer and a gas-barrier resin layer comprising a polyamide resin or an ethylene-vinyl alcohol copolymer, the adhesive polymer composition layer comprising a modified polyester type elastomer obtained by modifying a saturated polyester type thermoplastic elastomer having a polyalkylene ether glycol segment content of 58 to 73% by weight with an unsaturated carboxylic acid or a derivative thereof in the presence of a radical generator.

Another gist of the invention resides in the molded laminate characterized in that the adhesive polymer composition has an MFR (measured at 230° C. under 2.16 kg load according to JIS K7210) of 40 to 300 (g/10 min).

Still another gist of the invention lies in that a molded laminate characterized in that a base resin layer comprising at least one of a polyester type resin, a styrene type resin, a polycarbonate type resin, an acrylic type resin, and a urethane type resin is laminated with the gas barrier resin layer via the adhesive polymer composition layer.

Yet another gist of the invention exists in that the molded laminate characterized in that the modified polyester type elastomer has an amount of modification of 0.01 to 15 as obtained by an infrared absorption spectrum method, the amount of modification being represented by:

$$A_{1786}/(Ast \times r)$$

[wherein $A_{1786}$ is a peak intensity at 1786 cm$^{-1}$ of a 20 μm thick film of a modified polyester type elastomer; Ast is a peak intensity at a reference wavenumber of a 20 μm thick film of a standard sample (a saturated polyester type elastomer having a polyalkyl ether glycol segment content of 65% by weight); and r is the quotient of the mole fraction of the polyester segment in the modified polyester type elastomer divided by the mole fraction of the polyester segment in the standard sample].

An additional gist of the invention consists in the molded laminate characterized in that the compounding ratio of the radical generator is 0.001 to 3 parts by weight per 100 parts by weight of the saturated polyester type thermoplastic elastomer.

The embodiments of the present invention will be described below in detail.

[1] Adhesive Polymer Composition Layer

The adhesive polymer composition layer which constitutes the molded laminate of the invention comprises a modified polyester type elastomer obtained by modifying a saturated polyester type thermoplastic elastomer containing a polyalkylene ether glycol segment with an unsaturated carboxylic acid or a derivative thereof. The adhesive polymer composition preferably has a JIS D-hardness (hardness with a durometer, type D according to JIS K6253) of 10 to 80, particularly 15 to 70, especially 20 to 60. An adhesive polymer composition having a JIS-D hardness less than the above range tends to have poor heat resistance, and one having a JIS-D hardness more than the above range tends to have poor rubbery elasticity and adhesion.

It is preferred for the adhesive polymer composition to have an MFR (according to JIS K7210, 230° C., 2.16 kg) of 40 to 300 (g/10 min), desirably 42 to 150 (g/10 min), more desirably 45 to 100 (g/10 min). Where the MFR exceeds the above range, the composition may have too small melt tension, which can cause drawdown in molding. An MFR lower than the above range tends to result in poor molding properties due to insufficient flowability.

The "modification" as used herein includes a grafting modification of a saturated polyester type thermoplastic elastomer containing a polyalkylene ether glycol segment with an unsaturated carboxylic acid or a derivative thereof, a terminal modification, a modification by means of an ester exchange, a modification by means of a decomposition, and the like. More specifically, conceivable sites to which an unsaturated carboxylic acid or a derivative thereof is bonded include terminal functional groups and alkyl chain moieties, particularly a terminal carboxylic acid moiety, a terminal hydroxyl group, and the carbon atom of the polyalkylene ether glycol segment at the α- or β-position with respect to the ether linkage. It is assumed that a major proportion of the unsaturated carboxylic acid or its derivative is bonded to the α-position of the ether linkage in the polyalkylene ether glycol segment.

(1) Compounding Materials

Component (A): Saturated Polyester Type Thermoplastic Elastomer

The saturated polyester type thermoplastic elastomer as component (A) which can be used in the invention is usually a block copolymer made up of soft segments containing polyalkylene ether glycol segments and hard segments containing aromatic polyester. In order for the adhesive polymer composition to exhibit desired physical properties, especially adhesion, it is important that the soft segment be a polyalkylene ether glycol segment or a segment containing it.

Unsaturated polyester type elastomers having a double bond or a triple bond between carbon atoms in their main chain are unsuitable because they easily undergo coloration due to heat or light and tend to gel on molding, which impairs the appearance and mechanical strength particularly of laminated composite films or sheets.

The polyalkylene ether glycol segment content in the saturated polyester type thermoplastic elastomer should be 58 to 73% by weight, preferably 60 to 70% by weight, based on the polyester type elastomer. If the polyalkylene ether glycol segment content is less than the above range, the resulting adhesive polymer composition fails to manifest sufficient adhesion to a polyamide resin and an ethylene-vinyl alcohol copolymer, and the resulting molded laminate will have poor low-temperature impact resistance. If it exceeds the above-described range, the resulting adhesive polymer composition fails to manifest sufficient adhesion to a polyester type resin, and the resulting molded laminate will have poor mechanical strength in a high-temperature atmosphere.

The polyalkylene ether glycol constituting the soft segment includes polyethylene glycol, poly(1,2- and 1,3-propylene ether) glycol, poly(tetramethylene ether) glycol, and poly(hexamethylene ether) glycol. Poly(tetramethylene ether) glycol is particularly preferred.

Polyalkylene ether glycols having a number average molecular weight of 400 to 6,000 are usually used in the invention. Those having a number average molecular weight of 600 to 4,000 are preferred. Those of 1,000 to 3,000 are still preferred. With a number average molecular weight smaller than 400, the effects of modification with an unsaturated carboxylic acid or a derivative thereof are not enough to exert sufficient adhesion. If the number average molecular weight exceeds 6,000, phase separation occurs easily in the produced elastomer, and the polymer obtained by copolymerization and the like tends to have reduced physical properties. The term "number average molecular weight" as referred to herein is a value measured by gel-permeation chromatography (GPC). In preparing calibrations for GPC, Polytetrahydrofuran Calibration Kit available from Polymer Laboratories, U.K. can be used.

The saturated polyester type thermoplastic elastomers are generally prepared by polycondensation of oligomers obtained through esterification or ester exchange using (i) an aliphatic and/or alicyclic diol having 2 to 12 carbon atoms, (ii) an aromatic dicarboxylic acid and/or alicyclic dicarboxylic acid or an alkyl ester thereof, and (iii) a polyalkylene ether glycol having a number average molecular weight of 400 to 6,000 as a starting meterial.

The aliphatic and/or alicyclic diol having 2 to 12 carbon atoms include those usually used as a starting material of polyesters, particularly of polyester type thermoplastic elastomers. Examples are ethylene glycol, propylene glycol, trimethylene glycol, 1,4-butanediol, 1,4-cyclohexanediol, and 1,4-cyclohexanedimethanol. Preferred of them are 1,4-butanediol and ethylene glycol, with 1,4-butanediol being especially preferred. These diols can be used either individually or as a mixture of two or more thereof.

The aromatic dicarboxylic acid and/or alicyclic dicarboxylic acid include those generally employed as starting materials of polyesters, particularly of polyester type thermoplastic elastomers. Examples are terephthalic acid, isophthalic acid, phthalic acid, 2,6-naphthalenedicarboxylic acid, and cyclohexanedicarboxylic acid. Preferred of them are terephthalic acid and 2,6-naphthalenedicarboxylic acid, with terephthalic acid being especially suitable. These dicarboxylic acids can be used as a combination of two or more thereof.

In using an alkyl ester of an aromatic dicarboxylic acid and/or an aliphatic dicarboxylic acid, a dimethyl ester, a diethyl ester, etc. of the above-recited dicarboxylic acids are useful. Preferred are dimethyl terephthalate and 2,6-dimethyl naphthalenedicarboxylate.

In addition to the above-described components, a trifunctinal triol or tricarboxylic acid or an ester thereof may be copolymerized in a small proportion. An aliphatic dicarboxylic acid, e.g., adipic acid, or a dialkyl ester thereof is also usable as a copolymerizable component.

The above-mentioned kinds of polyalkylene ether glycols and suitable molecular weight range thereof apply to the starting polyalkylene ether glycol.

Commercially available products of the polyester type thermoplastic elastomers include Primalloy available from Mitubishi Chemical Corporation, Pelprene available from Toyobo Co., Ltd., and Hytrel available from Du Pont-Toray Co., Ltd.

Component (B): Unsaturated Carboxylic Acid or Derivative Thereof

The unsaturated carboxylic acid or its derivative which can be used in the present invention includes unsaturated carboxylic acids, such as acrylic acid, maleic acid, fumaric acid, tetrahydrophthalic acid, it aconic acid, citraconic acid, crotonic acid, and isocrotonic acid; unsaturated carboxylic acid anhydrides, such as 2-octen-1-yl succinic anhydride, 2-dodecen-1-yl succinic anhydride, 2-octadecen-1-yl succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic acid anhydride, 1-cyclopentene-1,2-dicarboxylic acid anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic acid anhydride, methyl-5-norbornene-2,3-dicarboxylic acid anhydride, endo-bicyclo[2.2.2]oct-5-ene-2,3-dicarboxylic acid anhydride, and bicyclo[2.2.2]oct-7-ene-2,3,5,6-tetracarboxylic acid anhydride; and unsaturated carboxylic acid esters, such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, lauryl (meth)acrylate, stearyl (meth) acrylate, glycidyl methacrylate, dimethyl maleate, 2-ethylhexyl maleate, and 2-hydroxyethyl methacrylate. Unsaturated carboxylic acid anhydrides are preferred of them.

A suitable compound is chosen from among these compounds having an unsaturated bond according to the copolymer having a polyalkylene ether glycol segment to be modified and modification conditions. The above-described compounds can be used as a combination of two or more thereof. The compound having an unsaturated bond can be added as dissolved in an organic solvent, etc.

Component (C): Radical Generator

The radical generator which can be used to carry out radical reaction for modification in the invention includes organic or inorganic peroxides, such as t-butyl hydroperoxide, cumene hydroperoxide, 2,5-dimethylhexane-2,5-dihydroperoxide, 2,5-dimethyl-2,5-bis(t-butyloxy)hexane, 3,5,5-trimethylhexanoyl peroxide, t-butyl peroxybenzoate, benzoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds, such as 2,2'-azobisisobutyronitrile, 2,2'-azobis(isobutylamide) dihalides, 2,2'-azobis[2-methyl-N-(2-hydroxyethyl)propionamide], and azodi-t-butane; and carbon radical generators, such as dicumyl.

A radical generator to be used is selected appropriately according to the kind of the saturated polyester type thermoplastic elastomer containing a polyalkylene ether glycol segment and the kind of the unsaturated carboxylic acid or a derivative thereof which are used for modification processing and the conditions of the modification. Two or more of the radical generators may be used in combination. The radical generator may be added as dissolved in an organic solvent, etc.

In order to further improve the adhesion, a compound having an unsaturated bond (component (D)) can be used as a modification assistant in combination with component (C).

Component (D): Compound Having Unsaturated Bond

The compound having an unsaturated bond as component (D) is one having a carbon-carbon multiple bond other than the above-described component (B). Such a compound includes vinyl aromatic monomers such as styrene, methylstyrene, ethylstyrene, isopropylstyrene, phenylstyrene, o-methylstyrene, 2,4-dimethylstyrene, o-chlorostyrene, and o-chloromethylstyrene. Addition of these compounds is expected to bring about improvement on modification efficiency.

(2) Additive Compounding Materials (Optional Components)

The adhesive polymer composition of the invention can contain optional components according to purposes in addition to the above-described components (A) to (D) as far as the objects and effects of the present invention are not ruined.

Such components include resinous components, rubber components, fillers such as talc, calcium carbonate, mica, and glass fiber, plasticizers such as paraffin oil, and other various additives such as antioxidants, heat stabilizers, light stabilizers, ultraviolet absorbers, neutralizing agents, lubricants, anti-fogging agents, anti-blocking agents, slip agents, crosslinking agents, crosslinking assistants, colorants, flame retardants, dispersants, antistatics, antimicrobials, and fluorescent whitening agents.

Inter alia, addition of at least one antioxidants selected from phenolic compounds, phosphite compounds, thioethers, and aromatic amines is preferred.

(3) Compounding Ratio

A compounding ratio of the components making up the adhesive polymer composition of the present invention is: (B) 0.01 to 30 parts by weight, preferably 0.05 to 5 parts by weight, still preferably 0.1 to 2 parts by weight, particularly preferably 0.1 to 1 part by weight, of the unsaturated carboxylic acid or the derivative thereof and (C) 0.001 to 3 parts by weight, preferably 0.005 to 0.5 part by weight, still preferably 0.01 to 0.2 part by weight, particularly preferably 0.01 to 0.1 part by weight, of the radical generator per (A) 100 parts by weight of the saturated polyester type thermoplastic elastomer.

With the compounding amount of component (B) being less than the above range, modification with the compound having an unsaturated bond would be insufficient for manifestation of adhesion. A ratio of component (B) exceeding the above range results in formation of a thermoplastic elastomer with a reduced melt viscosity, which makes molding difficult. Where the compounding amount of component (C) is less than the above range, modification with the compound having an unsaturated bond tends to be insufficient for developing adhesion. Where it exceeds the above range, the resulting thermoplastic elastomer tends to have a reduced melt viscosity, resulting in deteriorated molding properties.

It is desirable for the modified polyester type elastomer to have an amount of modification of 0.01 to 15, preferably 0.03 to 2.5, still preferably 0.1 to 2.0, particularly preferably 0.2 to 1.8, as obtained by an infrared absorption spectrum method, the amount of modification being represented by:

$$A_{1786}/(Ast \times r)$$

[wherein $A_{1786}$ is a peak intensity at 1786 cm$^{-1}$ of a 20 μm thick film of a modified polyester type elastomer; Ast is a peak intensity at a reference wavenumber of a 20 μm thick film of a standard sample (a saturated polyester type elastomer having a polyalkyl ether glycol segment content of 65% by weight); and r is the quotient of the mole fraction of the polyester segment in the modified polyester type elastomer divided by the mole fraction of the polyester segment in the standard sample].

The amount of modification of the modified polyester type elastomer by an infrared absorption spectrum method is obtained as follows. A sample having a thickness of 20 μm is vacuum dried at 100° C. for 15 hours to remove any unreacted matter, and an infrared absorption spectrum is measured. The peak height of the absorption peak appearing at 1786 $cm^{-1}$ which is assigned to stretching vibration of the carbonyl group of acid anhydride origin is calculated from the resulting spectrum to obtain a peak intensity $A_{1786}$. (A line drawn tangent to the foot on each side of the absorption band in a range of from 1750 to 1820 $cm^{-1}$ was taken as a baseline.)

An infrared absorption spectrum of a standard sample, a 20 μm thick film (of a saturated polyester type elastomer having a polyalkyl ether glycol segment content of 65 wt %), is measured similarly. The height of a peak of the resulting spectrum at a reference wavenumber is calculated to obtain a peak intensity Ast. In the case of an aromatic polyester type elastomer having a benzene ring, for example, the height of an absorption peak appearing at 872 $cm^-$assigned to out-of-plane deformation of C—H of the benzene ring is calculated, (a line drawn tangent to the foot on each side of the absorption band in a range of 850 to 900 $cm^{-1}$ being taken as a baseline).

The peak at a reference wavenumber is chosen from absorption peaks that are not influenced by modification and have no overlapping neighboring peaks.

The amount of modification by an infrared absorption spectrum method is calculated from these two peak intensities according to the above-described formula. "r" is the quotient of the mole fraction of the polyester segment in the modified polyester type elastomer (of which the amount of modification is to be calculated) divided by the mole fraction of the polyester segment in the standard sample. The mole fraction "mr" of the polyester segment in each sample is obtained according to the formula shown below from the weight fractions of the polyester segment and the polyalkylene ether glycol segment ($w_1$ and $w_2$) and the molecular weights of monomer units constituting these segments ($e_1$ and $e_2$).

$$mr=(w_1/e_1)/[(w_1/e_1)+(w_2/e_2)]$$

(4) Method of Compounding

The method of compounding components (A), (B), and (C) and component (D), which is added if necessary, into the thermoplastic elastomer composition of the invention is not particularly restricted and includes a melt compounding process, a solution process, and a dispersion process. A melt kneading process is preferred in practice.

In an illustrative embodiment of the melt kneading process, powdered or granular components (A), (B), and (C) and, if desired, component (D) and the other compounding materials such as the above-described additive compounding materials (optional materials) are mixed uniformly at a prescribed compounding ratio in a Henschel mixer, a ribbon blender, a twin cylinder mixer, etc., and the blend is kneaded by means of an ordinary kneading machine, such as a Banbury mixer, a kneader, a roll or a singe- or multi-(e.g., twin-) screw extruder.

The melt kneading temperature of each component ranges from 100° C. to 300° C., preferably 120° C. to 280° C., still preferably 150° C. to 250° C. The order and the method of kneading the components are not particularly restricted. The components (A), (B), and (C) and the additive compounding materials such as component (D) may be kneaded all together, or some of the components (A) to (D) may be kneaded, and the rest including the additive compounding materials are kneaded. From the standpoint of improving adhesion, it is favorable to add component (C) simultaneously with component (B) and component (D), when component (C) is compounded.

[2] Molded Laminate

Having excellent heat fusion-bond properties to a variety of thermoplastic resins including a polyamide resin and an ethylene-vinyl alcohol copolymer, the adhesive polymer composition is capable of making a molded laminate with various thermoplastic resins. A molded laminate with not only one kind but two or more kinds of various thermoplastic resins can be made. In the adhesive polymer composition the saturated polyester type thermoplastic elastomer containing a polyalkylene ether glycol segment has been modified with an unsaturated carboxylic acid or a derivative thereof. That is, the thermoplastic elastomer has a reactive group introduced therein by the grafting reaction and terminal addition reaction of the unsaturated carboxylic acid or the derivative thereof. Therefore, the modified thermoplastic elastomer exhibits enhanced chemical reactivity forming chemical bond and hydrogen bond to various thermoplastic resins to exert improved adhesion particularly to thermoplastic resins having an amino group, a hydroxyl group or a urethane bond.

A molded laminate comprising a layer of the adhesive polymer composition and a gas barrier resin layer comprising a polyamide resin or an ethylene-vinyl alcohol copolymer is a basic embodiment of the present invention. A multilayer molded laminate, e.g., a laminated film, comprising a gas barrier resin layer comprising a polyamide resin or an ethylene-vinyl alcohol copolymer, a base resin layer comprising at least one of other thermoplastic resins, such as polyester type resins, styrene type resins, polycarbonate type resins, acrylic type resins, and urethane type resins, and a layer of the adhesive polymer composition interposed therebetween is a particularly preferred embodiment for making full use of the excellent fusion-bond properties of the above composition.

The gas barrier resin layer usually has excellent gas barrier properties (impermeability to oxygen, nitrogen, carbon dioxide, steam, propane, butane, isobutane, etc.), and the base resin layer is usually excellent in rigidity and heat resistance. As a result, the molded laminate according to the above-mentioned preferred embodiment possesses both of these properties.

The molded laminate of the invention is not easily separated into each layer by hand at a life temperature (0 to 40° C.) and exhibits satisfactory interlaminar adhesion even in a high temperature atmosphere of 100° C. or higher. Interlaminar peeling would involve considerable difficulty.

(1) Gas Barrier Resin Layer

The gas barrier resin making the gas barrier resin layer is a polyamide resin or an ethylene-vinyl alcohol copolymer.

Polyamide resins are generally produced by condensation between a linear diamine represented by formula (1):

(wherein x is an integer of 4 to 12), and a linear dicarboxylic acid represented by formula (2):

(wherein y is an integer of 2 to 12).

Ring-opening polymerization of lactams also provide polyamide resins. Examples of the polyamide resins include polyamide 6,6, polyamide 6,9, polyamide 6,10, polyamide 6,12, polyamide 4,6, polyamide 6, polyamide 12, and polyamide 11.

Copolyamides, such as polyamide 6/6,6, polyamide 6/6,10, polyamide 6/12, polyamide 6/6,12, polyamide 6/6,6/6,10, and polyamide 6/6,6/12, are useful as well.

Semi-aromatic polyamides, such as polyamide 6/6,T (T: terephthalic acid component), polyamide 6,T/6,I (I: isophthalic acid component), and polyamide MXD6, are also useful. Semi-aromatic polyamides are produced by, for example, substituting the linear dicarboxylic acid of formula (2) with an aromatic dicarboxylic acid, e.g., terephthalic acid or isophthalic acid (the diamine may also be substituted with an alicyclic diamine) or substituting the linear diamine of formula (1) with an aromatic diamine, e.g., m-xylenediamine. Polyester amides having part of the diamine substituted with a diol are also useful as a matter of course.

Polyamide 6 and polyamide MXD6 are particularly preferred polyamide resins.

Commercially available products of such polyamide resins include Novamid and Reny, both available from Mitsubishi Engineering-Plastics Corporation.

Ethylene-vinyl alcohol copolymers (EVOH) are ethylene-vinyl acetate copolymer saponification products. Commercially available products of such copolymers include Eval supplied by Kuraray Co., Ltd. The polyamide resins and the ethylene-vinyl alcohol copolymers can be used either individually or as a combination of two or more thereof.

(2) Base Resin Layer

The compatibility of the polyalkylene ether glycol segment or other block components of the modified polyester type elastomer can be made use of in adhesion to various thermoplastic resins other than those described above. Examples of such thermoplastic resins include polyester resins, such as PBT (polybutylene terephthalate), PET (polyethylene terephthalate), PEN (polyethylene naphthalate), PCT (polycyclohexane terephthalate), and PETG (polyethylene terephthalate/polycyclohexane terephthalate copolymer); styrene type resins, such as GPPS (polystyrene comprising homopolymer), HIPS (high-impact polystyrene), ABS resins (acrylonitrile-butadiene-styrene resins), and AS resins (acrylonitrile-styrene resins); polycarbonate type resins, acrylic type resins, urethane type resin, polyvinyl chloride resins, and modified polyphenylene ethers, such as HIPS-modified PPE and nylon-modified PPE. Among them, base resins comprising at least one of polyester type resins, styrene type resins, polycarbonate type resins, acrylic type resins, and urethane type resins are preferred.

The polyester resins include thermoplastic polyesters which are generally produced by condensation between a dicarboxylic acid or a derivative thereof (such as a lower alkyl ester, an acid halide or an anhydride) and a glycol.

The dicarboxylic acid used to produce the polyesters include the following aromatic and aliphatic dicarboxylic acids: oxalic acid, malonic acid, succinic acid, glutaric acid, adipic acid, suberic acid, azelaic acid, sebacic acid, terephthalic acid, isophthalic acid, p-carboxyphenylacetic acid, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylmethane, p,p'-dicarboxydiphenylpropane, p,p'-dicarboxydiphenyloctane, 3-alkyl-4-($\beta$-carboxyethoxy)benzoic acids, 2,6-naphthalenedicarboxylic acid, and 2,7-naphthalenedicarboxylic acid. Mixtures of these dicarboxylic acids are useful as well. Particularly preferred of them is terephthalic acid.

The glycol fit for production of the polyesters includes straight-chain alkylene glycols having 2 to 12 carbon atoms, e.g., ethylene glycol, 1,3-propylene glycol, 1,6-hexylene glycol, 1,10-decamethylene glycol, and 1,12-dodecamethylene glycol. A part or the whole of the straight-chain alkylene glycol may be displaced with an aromatic glycol. Suitable aromatic glycols include p-xylylene glycol, pyrocatechol, resorcinol, hydroquinone, and alkyl-substituted derivatives of these compounds. Another group of suitable glycols is alicyclic glycols such as 1,4-cyclohexanedimethanol. Preferred glycols are straight-chain alkylene glycols having 2 to 4 carbon atoms.

Preferred polyesters are polyethylene terephthalate, polypropylene terephthalate, and polybutylene terephthalate. Polybutylene terephthalate is a still preferred polyester.

Commercially available products of these polyester resins include Novapex from Mitsubishi Chemical Corporation, Novadur from Mitsubishi Engineering-Plastics Corporation, Duranex from Polyplastics Co., Ltd., and PET-G from Eastman Chemical Company.

(3) Compounding

In practice various additives can be compounded into the thermoplastic resin according to necessity. Such additives include rubber components, fillers, e.g., talc, calcium carbonate, mica, and glass fiber, plasticizers, e.g., paraffin oil, antioxidants, heat stabilizers, light stabilizers, ultraviolet absorbers, neutralizing agents, lubricants, lubricants, anti-fogging agents, anti-blocking agents, slip agents, dispersants, colorants, antimicrobials, and fluorescent whitening agents. Compounds containing reinforcing materials such as glass fiber and other fillers are particularly preferred.

[3] Laminate Molding

The molded laminate of the present invention can be produced from the above-described molding materials, i.e., the adhesive polymer composition and the thermoplastic resins by various molding techniques, such as (co)extrusion, blown-film extrusion, blow molding, rotational molding, press molding, and injection molding (insert injection molding, two color injection molding, core-back injection molding, sandwich injection molding, and injection-press molding). (Co)extrusion is particularly preferred for making effective use of the excellent heat fusion-bond properties and processability of the adhesive polymer composition and for achieving improved productivity.

It is important to use dry materials for molding. Preliminary drying of the materials is preferably carried out at a temperature of 40 to 150° C., particularly 60 to 130° C., especially 80 to 120° C., for a drying time of 1 to 24 hours, particularly 1 to 10 hours, especially 2 to 6 hours. Drying under reduced pressure is more effective to lower the drying temperature and shorten the drying time.

Molding out of undried materials can result in surface roughening or reduction of physical properties of the resulting molded articles.

[4] Applications

The molded laminates of the present invention are useful as various industrial parts, packaging materials, and the like.

More specifically, they are applicable to packaging containers for food which require laminating a resin excellent in rigidity and flavor retaining properties (e.g., PET or PBT) with a resin excellent in gas barrier properties (e.g., nylon or an ethylene-vinyl alcohol copolymer), packaging containers for medical use and retortable containers which require tight seal, medical or industrial articles, and food or medical materials which require heat resistance against sterilization or a like operation. They also find applications to automobile interior parts such as steering wheels and air bag covers; automobile exterior parts such as bumpers and moldings; automobile functional parts such as rack-and-pinion boots, suspension boots, constant velocity joint boots, and diaphragms; parts of domestic appliances such as vacuum cleaner bumpers, remote controls, rolls and key-tops of official automation equipment; underwater articles such as swimming goggles and underwater camera covers; various cover parts; various grip parts; various industrial parts with gasket or sealer for tight sealing, waterproofing, soundproofing, vibration damping, and the like; electric and electronic parts such as curled cord coatings, belts, hoses, tubes and soundproofing gear; sports goods; sheeting; shoes; canvas for use as tents; nonwoven fabric, cloth, knitted fabric, and the like.

EXAMPLES

The present invention will now be illustrated in greater detail with reference to Examples, but it should be understood that the invention is not construed as being limited thereto.

[1] Materials (1) Adhesive Polymer Composition
Component (A): Saturated Polyester Type Thermoplastic Elastomer A-1: Polyester Type Elastomer A polyester type thermoplastic elastomer which was a polyester/polyether block copolymer having polybutylene terephthalate as a hard segment and polytetramethylene ether glycol having a number average molecular weight of 2000 as a soft segment and having a polytetramethylene ether glycol segment content of 65% by weight was used. (Flexural modulus: 35.5 MPa; density: 1.09 g/cm$^3$; melting peak temperature with a differential scanning calorimeter: 185.0° C.; JIS-D hardness: 34.)

A-2: Polyester Type Elastomer

A polyester type thermoplastic elastomer which was a polyester/polyether block copolymer having polybutylene terephthalate as a hard segment and polytetramethylene ether glycol having a number average molecular weight of 1000 as a soft segment and having a polytetramethylene ether glycol segment content of 25% by weight was used. (Flexural modulus: 267 MPa; density: 1.22 g/cm$^3$; melting peak temperature with a differential scanning calorimeter: 210.0° C.; JIS-D hardness: 60.)

A-3: Polyester Type Elastomer

A polyester type thermoplastic elastomer which was a polyester/polyether block copolymer having polybutylene terephthalate as a hard segment and polytetramethylene ether glycol having a number average molecular weight of 2000 as a soft segment and having a polytetramethylene ether glycol segment content of 72% by weight was used. (Flexural modulus: 22.6 MPa; density: 1.07 g/cm$^3$; melting peak temperature with a differential scanning calorimeter: 160.0° C.; JIS-D hardness: 28.)

A-4: Polyester Type Elastomer

A polyester type thermoplastic elastomer which was a polyester/polyether block copolymer having polybutylene terephthalate as a hard segment and polytetramethylene ether glycol having a number average molecular weight of 2000 as a soft segment and having a polytetramethylene ether glycol segment content of 55% by weight was used. (Flexural modulus: 55.3 MPa; density: 1.12 g/cm$^3$; melting peak temperature with a differential scanning calorimeter: 197.0° C.; JIS-D hardness: 41.)

A'-1: Polybutylene Terephthalate Resin (PBT)

Novadur 5505S available from Mitubishi Engineering-Plastics Corporation was used as a comparative example (polymer containing no polyalkylene ether glycol segment).

A'-2: Modified Polyolefin Resin

MODIC.AP S505 available from Mitubishi Chemical Corporation was used as a comparative example (adhesive polymer composition containing no modified polyester type elastomer).

Component (B): Unsaturated carboxylic acid or derivative thereof

B-1: Unsaturated Carboxylic Acid Anhydride

Maleic anhydride (guaranteed reagent) available from Wako Pure Chemical Industries, Ltd. was used. Component (C): Radical generator C-1: 2,5-Dimethyl-2,5-bis(t-butylperoxy)hexane, Perhexa 25B available from NOF Corporation, was used.

(2) Thermoplastic Resin

Polyamide 6 Resin (PA6)

Novamid 1020CA2 from Mitubishi Engineering-Plastics Corporation was used. Ethylene-vinyl alcohol copolymer (EVOH)

Eval EP-F101A from Kuraray Co., Ltd. was used. Polybutylene terephthalate resin (PBT)

Novadur 5505S from Mitubishi Engineering-Plastics Corporation was used.

[2] Examples 1 to 5 and Comparative Examples 1 to 6

Preparation of Adhesive Polymer Composition

A polyester type thermoplastic elastomer (A-1, A-2, A-3 or A-4) or a polybutylene terephthalate resin (A'-1), an unsaturated carboxylic acid anhydride (B-1), and a radical generator (C-1) were melt-kneaded in a kneading machine TEX-44 supplied by The Nippon Steel Works, Ltd. (diameter: 44 mm; temperature: 190 to 220° C.) in the weight ratio shown in the composition column of Tables 1 and 2, and the mixture was pelletized through a pelletizer to prepare an adhesive polymer composition. The results of evaluation of physical properties are shown in Tables 1 and 2.

Molding of Molded Laminate
a) Two-layer Co-extrusion Sheet Forming

A molded laminate comprising an adhesive polymer composition layer and a gas barrier resin layer (a polyamide resin layer or an ethylene-vinyl alcohol copolymer layer) was prepared by use of a small-scaled two-layer sheeting machine having a 30 mm-diameter cylinder and a 20 mm-diameter cylinder (die width: 50 mm; thickness: 1 mm; die temperature; 250° C. (for PA6) or 220° C. (for EVOH)) The results of evaluation of heat fusion-bond properties are shown in Table 1.

b) Press Molding

The adhesive polymer composition obtained and the polyamide resin were each molded in a flat press into a sheet of 50 mm in width, 50 mm in length and 0.5 mm in thickness. The resulting sheets were superposed, fitted into a spacer of 50 mm in width, 50 mm in length and 1 mm in thickness, and molded in a flat press (preliminary heating: 250° C.×2 mins.; pressure application: 50 kgf/cm²×2 mins) to obtain a molded laminate. The results of evaluation for heat fusion-bond properties are shown in Table 1.

c) Three-layer Co-extrusion T-die Film Forming

The adhesive polymer composition obtained, a gas barrier resin (polyamide 6 resin), and a base resin (polybutylene terephthalate resin) were molded by means of a three-layer co-extrusion T-die film forming machine having a 35 mm-diameter cylinder and two 20 mm-diameter cylinders (die width: 300 mm; die temperature: 250° C.) to obtain a molded laminate comprising three layers of different kinds (thickness constitution: gas barrier resin layer/adhesive polymer composition layer/base resin layer=30 µm/10 µm/30 µm). The results of evaluation of heat fusion-bond properties are shown in Table 2.

[3] Comparative Examples 7 to 8

A molded laminated film comprising three layers of different kinds was obtained in the same manner as in (c) above (three-layer co-extrusion T-die film forming), except for replacing the adhesive polymer composition obtained with a modified polyolefin resin (A'-2) or a mixture of the modified polyester type elastomer obtained in Example 4 and the polyamide 6 resin. The composition and the results of evaluation of heat fusion-bond properties are shown in Table 3.

[4] Method of Evaluation

In Examples and Comparative Examples physical properties were evaluated according to the following methods.

(1) Melt Flow Rate (MFR)

The MFR of the resulting pellets was measured at a temperature of 230° C. under a load of 2.16 kg in accordance with JIS K7210.

(2) Amount of Modification by Infrared Absorption Spectrum Method

The resulting pellets were molded into a 20 µm thick film by press molding (230° C.) to prepare a sample. The amount of modification of the sample was calculated by an infrared absorption spectrum method using an FT-IR apparatus (JASCO FT/IR610, supplied by JASCO Corporation) in accordance with the above-described procedures. The mole fraction of the polyester segment in the polyester type elastomer used as a standard was 0.15, and Ast was 0.144.

(3) Heat Fusion-bond Properties (Adhesive Strength)

A strip specimen having a width of 25 mm (and a length of 100 mm in the case of a co-extruded product and 50 mm in the case of a press molded product) was made of the resulting molded laminate. The adhesive polymer composition layer (thickness: 1.0 mm in the case of a co-extruded sheet, 0.5 mm in the case of a press molded sheet) and the gas barrier resin layer (thickness: 0.5 mm) were peeled apart at a peel angle of 180° C. at a pulling speed of 200 mm/min to measure an adhesive strength (unit: kgf/25 mm) at the fusion-bonded interface between the adhesive polymer composition layer and the gas barrier resin layer. The measurement was made at a temperature of 23° C., 100° C., and 120° C. to evaluate high-temperature heat fusion-bond properties (adhesive strength) at the same time.

As for the molded laminated film comprising three layers of different kinds, the adhesive strength at the fusion-bonded interface between the adhesive polymer composition layer and the gas barrier resin layer and the adhesive strength at the fusion-bonded interface between the adhesive polymer composition layer and the base resin layer were measured in the same manner as described above except for changing the pulling speed to 100 mm/min. Of the resulting measured values the smaller one (the adhesive strength of the more easily peelable interface) was taken as the adhesive strength of the specimen (unit: gf/15 mm).

TABLE 1

|  |  | Unit | Example | | | Comparative Example | | | | |
|---|---|---|---|---|---|---|---|---|---|---|
|  |  |  | 1 | 2 | 3 | 1 | 2 | 3 | 4 | 5 |
| <Adhesive Polymer Composition> | | | | | | | | | | |
| Composition: | | | | | | | | | | |
| Polyester Type Elastomer | A-1 | Parts by | 100 | 100 | 100 | 100 | 100 | 100 | — | — |
|  | A-2 | weight | — | — | — | — | — | — | 100 | — |
| Polybutylene terephthalate Resin | A'-1 |  | — | — | — | — | — | — | — | 100 |
| Unsaturated Carboxylic Acid Anhydride | B-1 |  | 1 | 1 | 3 | 0 | 0 | 1 | 1 | 1 |
| Radical Generator | C-1 |  | 0.03 | 0.05 | 0.05 | 0 | 0.1 | 0 | 0.05 | 0.05 |
| Physical Properties: | | | | | | | | | | |
| Melt Flow Rate (MFR) |  | g/10 min | 45 | 50 | 67 | 21 | 45 | 40 | 80 | 40 |
| Amount of Modification by IR Absorption Spectrum Method |  |  | 0.46 | 0.53 | 1.61 | 0.00 | 0.00 | 0.06 | 0.02 | 0.00 |
| JIS D-Hardness |  |  | 33 | 32 | 31 | 36 | 33 | 32 | 58 | 83 |

TABLE 1-continued

|  |  |  | Unit | Example | | | Comparative Example | | | | |
|---|---|---|---|---|---|---|---|---|---|---|---|
|  |  |  |  | 1 | 2 | 3 | 1 | 2 | 3 | 4 | 5 |

<Molded laminate> (Adhesive Polymer Composition Layer/Gas Barrier Resin Layer)

Physical Properties:

| | Heat Fusion-bond Properties (Adhesive Strength) | Peeling Temperature | | | | | | | | |
|---|---|---|---|---|---|---|---|---|---|---|
| Polyamide 6 Resin | Two-layer Co-extrusion Sheet Forming | 23° C. 100° C. 120° C. | kgf/25 mm | 13.0 4.5 4.0 | 15.0 5.0 4.5 | 16.4 5.6 4.9 | 0.0 0.0 0.0 | 0.0 0.0 0.0 | 6.0 2.5 1.5 | 0.0 0.0 0.0 | 0.0 0.0 0.0 |
| | Press molding | 23° C. 100° C. 120° C. | | 9.6 4.0 3.5 | 10.0 5.0 4.5 | 11.2 4.9 4.0 | 0.0 0.0 0.0 | 0.0 0.0 0.0 | 5.0 2.3 1.3 | 0.0 0.0 0.0 | 0.0 0.0 0.0 |
| Ethylene-Vinyl Alcohol Copolymer | Two-layer Co-extrusion Sheet Forming | 23° C. 100° C. 120° C. | | 7.0 3.0 2.4 | 7.8 3.2 2.8 | 8.5 3.5 2.9 | 0.0 0.0 0.0 | 0.0 0.0 0.0 | 3.4 1.9 1.0 | 0.0 0.0 0.0 | 0.0 0.0 0.0 |

Polyalkylene ether glycol segment content (wt %): (A-1) = 65, (A-2) = 25

TABLE 2

|  |  |  | Unit | Example | | Comp. Ex. |
|---|---|---|---|---|---|---|
|  |  |  |  | 4 | 5 | 6 |

<Adhesive Polymer Composition>

Composition:

| Polyester Type Elastomer | A-1 A-3 A-4 | Parts by weight | 100 — — | — 100 — | — — 100 |
|---|---|---|---|---|---|
| Unsaturated Carboxylic Acid Anhydride | B-1 | | 0.5 | 0.5 | 0.5 |
| Radical Generator | C-1 | | 0.05 | 0.05 | 0.05 |

Physical Properties:

| Melt Flow Rate (MFR) | g/10 min | 48 | 55 | 65 |
|---|---|---|---|---|
| Amount of Modification by IR Absorption Spectrum Method | | 0.22 | 0.28 | 0.15 |
| JIS D-Hardness | | 34 | 28 | 41 |

<Molded laminate> (Base Resin Layer/Adhesive Polymer Composition Layer/Gas Barrier Resin Layer)

Physical Properties:

| Heat Fusion-Bond Properties (Adhesive Strength) | Peeling Temperature | | | | |
|---|---|---|---|---|---|
| Three-Layer T-Die Co-Extrusion Film Forming | 23° C. 100° C. 120° C. | gf/15 mm | 1050 330 220 | 830 230 105 | 840 60 15 |

Polyalkylene ether glycol segment content (wt %): (A-1) = 65, (A-3) = 72, (A-4) = 55

TABLE 3

|  |  |  | Unit | Comparative Example | |
|---|---|---|---|---|---|
|  |  |  |  | 7 | 8 |

<Adhesive Polymer Composition>

Composition:

| Modified Polyolefin Resin | A'-2 | Parts by weight | 100 | — |
|---|---|---|---|---|
| Modified Polyester Type Elastomer | Example 4 | | — | 95 |
| Polyamide 6 Resin | | | — | 5 |

<Molded laminate> (Base Resin Layer/Adhesive Polymer Composition Layer/Gas Barrier Resin Layer)

Physical Properties:

| Heat Fusion-Bond Properties (Adhesive Strength) | Peeling Temperature | | | |
|---|---|---|---|---|
| Three-Layer Co-Extrusion T-Die Film Forming | 23° C. 100° C. 120° C. | gf/15 mm | 800 10 0 | 0 0 0 |

[5] Analysis on the Results of Evaluation

The following observations can be drawn from Examples and Comparative Examples shown in Tables 1 through 3.

(1) The adhesive polymer composition layer used in the molded laminates of Examples 1 to 5 according to the present invention, which comprises a modified polyester type elastomer obtained by modifying component (A) with component (B) in the presence of component (C), is excellent in adhesive strength, particularly heat fusion-bond properties in a high-temperature atmosphere, with a gas barrier resin layer comprising a polyamide 6 resin or an ethylene-vinyl alcohol copolymer.

(2) In Comparative Example 1 where neither component (B) nor component (C) is used, adhesive strength is not exercised for a gas barrier resin layer comprising a polyamide 6 resin or an ethylene-vinyl alcohol copolymer. (3) In Comparative Example 2 wherein component (B) is not used, adhesive strength is not exerted for a gas barrier resin layer comprising a polyamide 6 resin or an ethylene-vinyl alcohol copolymer.

(4) In Comparative Example 3 wherein component (C) is not used, the adhesive strength for a gas barrier resin layer comprising a polyamide 6 resin or an ethylene-vinyl alcohol copolymer is insufficient.

(5) In Comparative Example 4 using an adhesive polymer composition which is obtained by modifying a polyester type elastomer whose polyalkylene ether glycol segment content (25% by weight) is less than the prescribed range, adhesive strength is not obtained for a gas barrier resin layer comprising a polyamide 6 resin or an ethylene-vinyl alcohol copolymer.

(6) In Comparative Example 5 where a polymer composition (A'-1) containing no polyalkylene ether glycol segment is used in place of component (A), adhesive strength is not exerted for a gas barrier resin layer comprising a polyamide 6 resin or an ethylene-vinyl alcohol copolymer.

(7) In Comparative Example 6 using an adhesive polymer composition which is obtained by modifying a polyester type elastomer whose polyalkylene ether glycol segment content (55% by weight) is less than the prescribed range, the adhesive polymer composition layer has poor adhesive strength, particularly heat fusion-bond properties in a high-temperature atmosphere, for a gas barrier resin layer comprising a polyamide 6 resin and a base resin layer comprising a polybutylene terephthalate resin.

(8) In Comparative Example 7 using a modified polyolefin resin in place of the modified polyester type elastomer, the heat fusion-bond properties to a gas barrier resin layer comprising a polyamide 6 resin is weak (at 100° C. and 120° C.)

(9) In Comparative Example 8 using a mixture of the modified polyester type elastomer and a polyamide resin in place of the modified polyester type elastomer, adhesive strength is not exerted for a gas barrier layer comprising a polyamide 6 resin and a base resin layer comprising a polybutylene terephthalate resin.

While the invention has been described in detail and with reference to specific examples thereof, it will be apparent to one skilled in the art that various changes and modifications can be made therein without departing from the spirit and scope thereof.

This application is based on Japanese patent application No. 2000–261699 filed Aug. 30, 2000, the entire contents thereof being hereby incorporated by reference.

Industrial Applicability

According to the present invention, an adhesive polymer composition layer comprising a modified polyester type elastomer which is obtained by modifying a polyester type thermoplastic elastomer containing a prescribed amount of a polyalkylene ether glycol segment with an unsaturated carboxylic acid or a derivative thereof in the presence of a radical generator is excellent in adhesive strength, particularly in high-temperature heat fusion-bond properties, with a thermoplastic resin layer comprising a polyamide resin or an ethylene-vinyl alcohol copolymer and therefore provides a molded laminate with excellent adhesive strength.

What is claimed is:

1. A molded laminate, which comprises:
   a) an adhesive polymer composition layer; and
   b) a gas-barrier resin layer comprising a polyamide resin or an ethylene-vinyl alcohol copolymer;
   said adhesive polymer composition layer comprising a modified polyester elastomer obtained by modifying a saturated polyester thermoplastic elastomer having a polyalkylene ether glycol segment content of 58 to 73% by weight with an unsaturated carboxylic acid or a compound thereof in the presence of a radical generator.

2. The molded laminate of claim 1, wherein said adhesive polymer composition has an MFR, measured at 230° C. under 2.16 kg load according to JIS K7210, of 40 to 300 (g/10 min).

3. The molded laminate of claim 2, wherein said MFR is from 42 to 150 (g/10 min).

4. The molded laminate of claim 3, wherein said MFR is from 45 to 100 (g/10 min).

5. The molded laminate of claim 1, which further comprises a base resin layer comprising at least one of a polyester resin, a styrene resin, a polycarbonate resin, an acrylic resin, or a urethane resin, which base resin layer is laminated with said gas barrier resin layer by said adhesive polymer composition layer.

6. The molded laminate of claim 1, wherein said modified polyester elastomer has an amount of modification of 0.01 to 15 as obtained by an infrared absorption spectrum method, said amount of modification being represented by:

$$A_{1786}/(Ast \times r)$$

wherein:

$A_{1786}$ is a peak intensity at 1786 cm$^{-1}$ of a 20 μm thick film of the modified polyester elastomer;

Ast is a peak intensity at a reference wave number of a 20 μm thick film of a standard sample, which is a saturated polyester elastomer having a polyalkyl ether glycol segment content of 65% by weight; and r is a quotient of the mole fraction of the polyester segment in the modified polyester elastomer divided by the mole fraction of the polyester segment in the standard sample.

7. The molded laminate of claim 1, wherein the radical generator is present in an amount of 0.001 to 3 parts by weight per 100 parts by weight of the saturated polyester thermoplastic elastomer.

8. The molded laminate of claim 1, wherein the adhesive polymer composition has a JIS D-hardness, according to JIS K6253, of 10 to 80.

9. The molded laminate of claim 8, wherein the JIS D-hardness is from 15 to 70.

10. The molded laminate of claim 1, wherein said polyalkylene ether glycol segment is from 60 to 70% by weight of said saturated polyester thermoplastic elastomer.

11. The molded laminate of claim 1, wherein the polyalkylene ether glycol comprising the segment comprises units of polyethylene glycol, poly(1,2- and 1,3-propylene ether) glycol, poly(tetramethylene ether) glycol or poly(hexamethylene ether) glycol.

12. The molded laminate of claim 11, wherein the polyalkylene ether glycol is poly(tetramethylene ether) glycol.

13. The molded laminate of claim 1, wherein the polyalkylene ether glycol has a number average molecular weight of from 400 to 6,000.

14. The molded laminate of claim 3, wherein the number average molecular weight is from 1,000 to 3,000.

15. The molded laminate of claim 1, wherein the compound of the unsaturated carboxylic acid is an ester or anhydride thereof.

16. The molded laminate of claim 15, wherein an unsaturated carboxylic acid anhydride is used.

17. The molded laminate of claim 1, wherein the radical generator is an organic or inorganic peroxide, an azo compound or dicumyl.

18. The molded laminate of claim 1, wherein said modified polyester elastomer is further obtained using a compound having a carbon-carbon multiple bond other than the unsaturated carboxylic acid or compound thereof.

19. A method of imparting flexibility, waterproofness or impact resistance to a molded article, which comprises laminating to adhesive polymer composition and gas-barrier resin layer of claim 1, onto a molded article.

20. The method of claim 19, which imparts flexibility to said molded article.

21. The method of claim 19, which imparts waterproofing to said molded article.

22. The method of claim 19, which imparts impact resistance to said molded article.

* * * * *